H. SKREBERG.
TRANSPORT.
APPLICATION FILED NOV. 5, 1915.
1,195,283.
Patented Aug. 22, 1916.
2 SHEETS—SHEET 1.
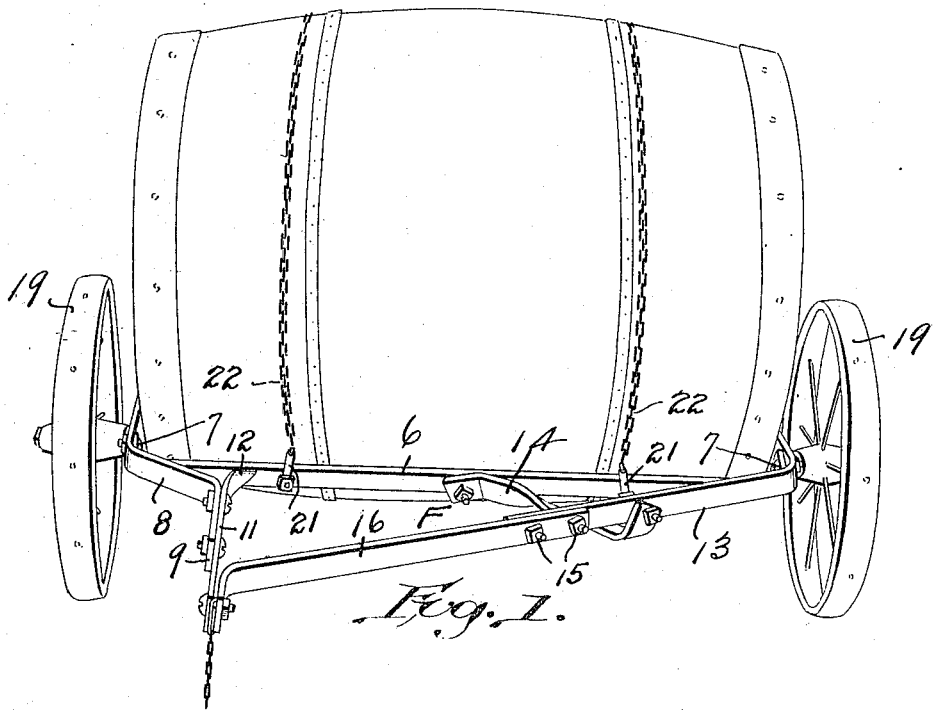
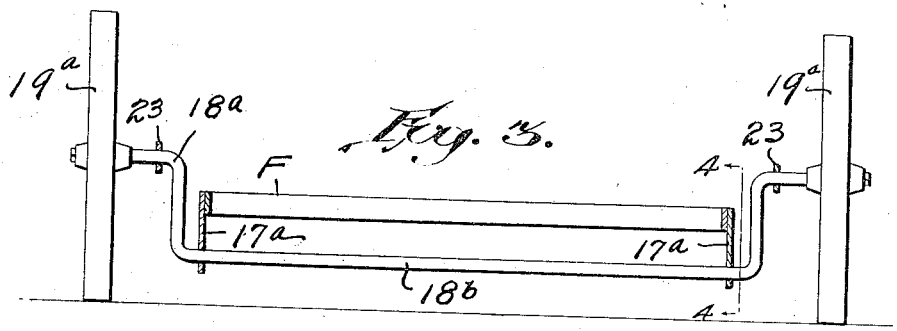
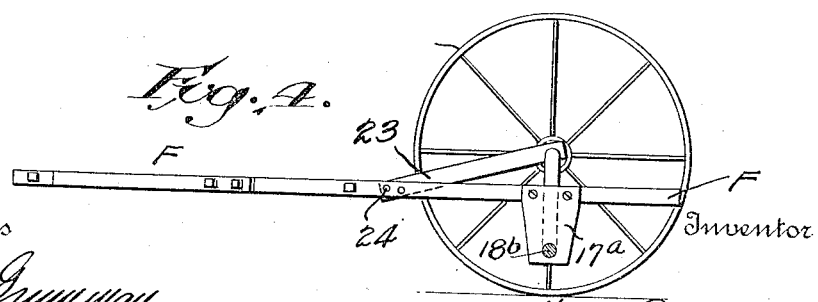
Witness
Inventor
HANS SKREBERG
By
Attorney

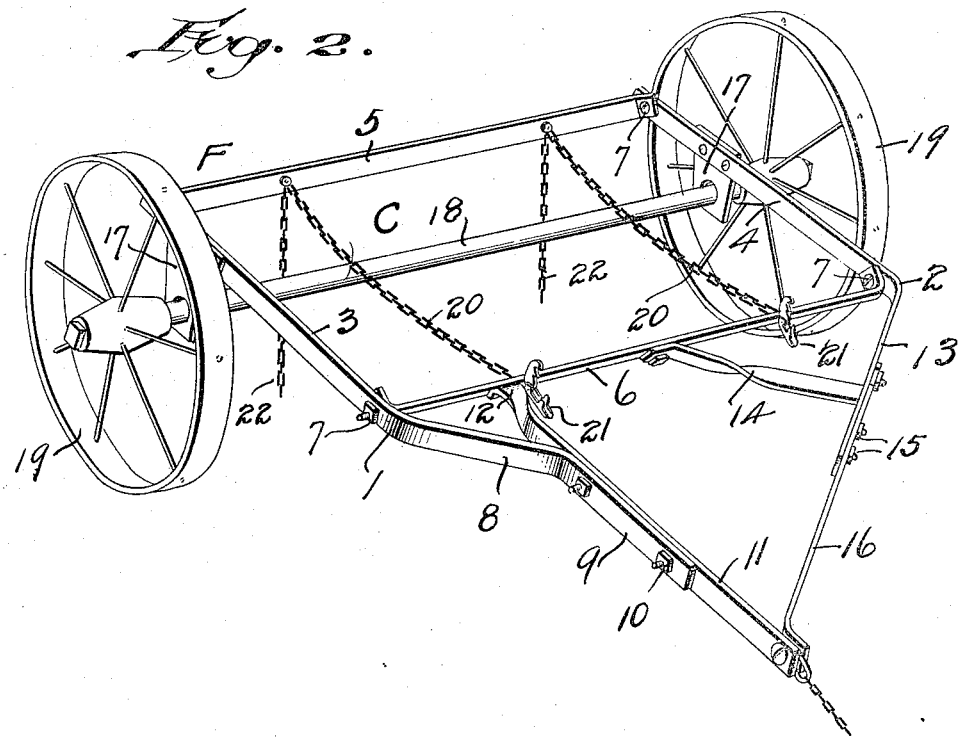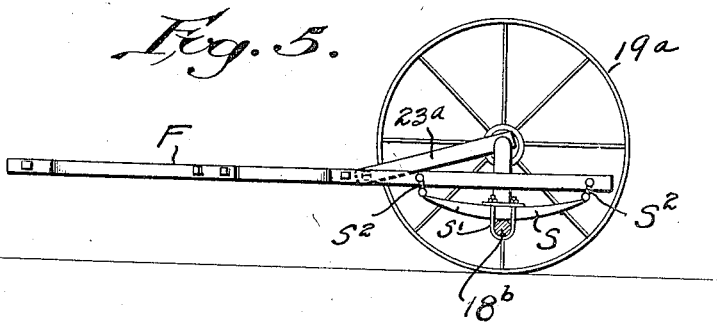

UNITED STATES PATENT OFFICE.

HANS SKREBERG, OF BIG BEND TOWNSHIP, CHIPPEWA COUNTY, MINNESOTA.

TRANSPORT.

1,195,283. Specification of Letters Patent. Patented Aug. 22, 1916.

Application filed November 5, 1915. Serial No. 59,874.

*To all whom it may concern:*

Be it known that I, HANS SKREBERG, a citizen of the United States, residing at Big Bend township, in the county of Chippewa and State of Minnesota, (whose post-office address is Milan, Minnesota,) have invented certain new and useful Improvements in Transports, of which the following is a specification, reference being had to the accompanying drawings.

This invention relates to a knock-down truck for transporting barrels or other containers, and more especially to a device of this character adapted to be trailed in rear of an automobile, wagon, or other tractor. To this end, the invention contemplates a simple and practical transporting device including a novel separable supporting frame that is light, but strong, and susceptible to a wide range of uses. In this connection, the invention is of special utility in the transportation of barreled or boxed commodities from place to place at a great saving of time and expense, and without overtaxing the usual capacity and power of the vehicle by which it is drawn.

In the handling of large and cumbersome barrels or boxes, it is not often convenient to lift the same from the ground level to a truck or wagon platform, and then again transfer them when the destination is reached. Therefore, the invention also has in view a construction, which when set up for use, may constitute a transportable base for the container until the contents thereof are exhausted, to thereby eliminate the repeated and unnecessary handling, and the arduous labor incident thereto.

A further object of the invention is to provide a transporting device of durable construction that may be readily shipped in a separable or "knock-down" condition, and easily and quickly set up and attached to the rear axle or axle housing of a motor vehicle to be thereby drawn from one place to another. In this connection, the invention is especially adapted to be thus transported without in any way interfering with the transmission casing of a power tractor.

With the above and other objects in view which will more readily appear as the nature of the invention is better understood, the same consists in the novel construction, combination and arrangement of parts hereinafter more fully described, illustrated and claimed.

A preferred and practical embodiment of the present invention is illustrated in the accompanying drawings in which—

Figure 1 is a perspective view showing the application of my invention. Fig. 2 is a perspective view of the transporting device as it appears with the barrel shown in Fig. 1 removed. Fig. 3 is a cross sectional view showing the modification. Fig. 4 is a longitudinal sectional view taken on the line 4—4 of Fig. 3. Fig. 5 is a detail sectional view similar to Fig. 4 showing a still further modification.

Similar reference characters designate corresponding parts throughout the several figures of the drawings.

In carrying out the present invention, it is proposed to utilize light but strong metallic frame bars which are so constructed that they may be readily connected and assembled by means of bolts and nuts to thus enable the entire device to be readily set up for use from a separated or knock-down condition. To this end, the invention preferably employs in the construction of the frame F, the opposite side bars 1 and 2, each of which preferably includes a straight body portion 3 and 4 respectively, to which may be conveniently secured the reversely inclined front and rear cross bars 5 and 6, by means of separable and detachable nut and bolt members 7. Thus, the cross bars coöperate with the side frame bars to provide a rectangular supporting cradle C.

As will be apparent from Fig. 2 of the drawings, the side frame bars 1 and 2 are provided at their forward ends with angled extensions, the bar 1 being provided with the forwardly extending arm 8 having a straight terminal portion 9 which may be detachably secured by means of the separable fastenings 10 to a draw-bar 11, one end 12 of which is secured to the front frame bar 6, preferably at one side of its center. That is to say, the draw bar 11 is offset so that when it is desired to attach the device to a motor vehicle, the draw bar will clear the differential casing and thereby be firmly attached to the rear axle housing. The opposite side frame bar 2 is also provided with an angled forwardly extending arm 13, which is connected with the front cross bar 6 by means of the oblique brace member 14, and also detachably secured, by means of the bolts 15, to a connector bar 16, one end of which is fastened to the front end of the draw-bar 11. With further reference to the side frame bars 1 and 2, it will be observed that each of the same is provided at the rear side of the center of the body portions 3 and 4 with rigid depending journal straps 17 which are adapted to receive the axle member 18 having thereon the wheels 19.

Although the cross bars 5 and 6 are reversely inclined, to thereby provide a cradle for receiving the barrel or other element to be transported, it is preferred to span the distance between the two bars by means of a pair of supporting chains 20, having snap hooks 21 connected with the ends which are secured to the front cross bars 6, and having their opposite ends 22 free to encircle or surround the device being carried to hold the same in the cradle provided by the cross bars and the supporting chains 20.

In cases where it is desired to have the wheels of relatively large diameter, and still maintain a lower center of gravity, the modification shown in Figs. 3 and 4 is preferably employed. In this construction, the axle 18$^a$ is provided with a dropped central portion 18$^b$, which carries the supporting framework designated in its entirety by F, and connected with the dropped axle portion 18$^b$ by means of the journal straps 17$^a$ rigidly carried by the framework. In addition to the same novel structural features of the framework F as adhered to in the construction shown in Fig. 1, it is preferred to employ the auxiliary bracing arms 23, one end of which is secured to the portion of the axle 18$^a$ which carries the wheels 19$^a$, while the other end is rigidly connected with the body of the frame as indicated at 24. In this construction, the load is carried relatively closely to the ground, the same as if wheels of small diameter are employed, as is preferable in connection with the construction shown in Fig. 1.

In connection with the modification of the invention just described, it may be advisable in some cases to mount the framework F of the device so that the commodity being carried will not be subjected to severe shocks and jolts caused by the unevenness of the road. In this connection, it will be noted that Fig. 5 shows a modification whereby this end may be conveniently accomplished. As shown, the framework F is supported on the dropped axle portion 18$^b$ by the elliptical springs designated as S. These springs are held to the axle 18$^b$ by means of the securing staples S′ and connected to the framework F by means of the shackles S$^2$. In this connection, the brace rods 23$^a$ are utilized to perform the same function as the braces 23 in the construction shown in Fig. 4. Accordingly, it will be apparent that although the structural characteristics of the framework F remain the same in the modifications as they do in the construction shown in Figs. 1 and 2, the mounting thereof may be varied to meet various conditions and requirements of service.

From the foregoing description, it is thought that the many features and advantages of the present invention will be readily apparent, and it will also be understood that various changes in the form, proportion, and minor details of construction may be resorted to without departing from the spirit of the invention or scope of the appended claims.

I claim:

1. A knock-down truck comprising a wheeled axle and a separable metallic frame supported on said axle and including a rectangular supporting cradle, journal members carried by said frame and bearing on the axle and a draw bar also carried by said frame and offset from the center of the side of said frame by which it is carried.

2. A knock-down truck comprising a wheeled axle and a separable metallic frame supported on said axle and including opposite side bars, cross frame members detachably connected with said side bars, journal members carried by said side frame bars and bearing on said axle, and draw bar means carried by one of the cross frame members and also connected with said side frame members, said bar also being located at one side of the short axis of said frame.

3. A knock-down truck, comprising a wheeled axle and a separable metallic framework supported on said axle between the wheels, and a draw bar carried by said frame and located at one side of the axis of said frame which is at right angles to the wheeled axle.

4. A knock-down truck, comprising a wheeled axle and a separable metallic frame supported on said axle and including opposite frame bars having angled extensions at their forward ends, cross frame bars detachably connecting the side bars, and a draw bar secured to one of the cross bars and connected to the angled extensions of the side bars.

5. A knock-down truck, comprising a wheeled axle and a separable metallic framework supported on said axle, said framework including opposite side bars having angled extensions at their forward ends, front and rear cross bars coöperating with the side bars to form a cradle, a draw-bar connected with said front cross bar and connecting with one of said side bars, and a connector bar between the front end of the draw-bar and the angled extension of the other frame bar.

6. A knock-down truck comprising a wheeled axle and a separable metallic framework supported on said axle, said framework including opposite side bars having angled extensions at their forward ends, reversely inclined front and rear cross-bars coöperating with the side bars to form a cradle, a draw-bar connected with the said front cross-bar at one side of its center and directly connecting with one of said side bars, a connector bar between the front end of the draw bar and the angled extension of the other frame bar, a brace having one end secured to the front cross bar and to the angled extension of one of the side bars, and chains spanning the distance between the front and rear cross-bars and having free holding ends.

Having thus shown, described and claimed my invention, I affix my signature in presence of two witnesses.

HANS SKREBERG.

Witnesses:
C. O. ERICKSON,
J. E. ODDAN.

Copies of this patent may be obtained for five cents each, by addressing the "Commissioner of Patents, Washington, D. C."